(12) United States Patent
Takeuchi et al.

(10) Patent No.: US 11,292,341 B2
(45) Date of Patent: Apr. 5, 2022

(54) VIBRATION DEVICE, ELECTRONIC APPARATUS, AND VEHICLE

(71) Applicant: Seiko Epson Corporation, Tokyo (JP)

(72) Inventors: Junichi Takeuchi, Chino (JP); Akira Mizuguchi, Minowa (JP); Akihiko Ebina, Fujimi (JP); Takashi Yamazaki, Shiojiri (JP)

(73) Assignee: Seiko Epson Corporation

( * ) Notice: Subject to any disclaimer, the term of this patent is extended or adjusted under 35 U.S.C. 154(b) by 70 days.

(21) Appl. No.: 16/857,310

(22) Filed: Apr. 24, 2020

(65) Prior Publication Data
US 2020/0338984 A1    Oct. 29, 2020

(30) Foreign Application Priority Data

Apr. 26, 2019 (JP) .............................. JP2019-086584

(51) Int. Cl.
*B60K 35/00* (2006.01)
*G10K 9/12* (2006.01)

(52) U.S. Cl.
CPC .............. *B60K 35/00* (2013.01); *G10K 9/12* (2013.01); *B60K 2370/157* (2019.05); *B60K 2370/68* (2019.05)

(58) Field of Classification Search
CPC .............. B60K 35/00; B60K 2370/68; B60K 2370/157; G10K 9/12
See application file for complete search history.

(56) References Cited

U.S. PATENT DOCUMENTS

| 2011/0199162 | A1* | 8/2011 | Funabiki | H03H 9/1021 |
| | | | | 331/158 |
| 2012/0229225 | A1 | 9/2012 | Horie | |
| 2014/0145559 | A1* | 5/2014 | Isohata | H03H 9/1021 |
| | | | | 310/315 |
| 2015/0170805 | A1 | 6/2015 | Ito et al. | |
| 2016/0035962 | A1* | 2/2016 | Yamashita | H03H 9/1021 |
| | | | | 310/348 |
| 2016/0036413 | A1* | 2/2016 | Yamashita | H03H 9/1014 |
| | | | | 331/158 |
| 2016/0352345 | A1* | 12/2016 | Hashi | H03L 7/26 |
| 2017/0111010 | A1* | 4/2017 | Kondo | H03B 28/00 |

FOREIGN PATENT DOCUMENTS

JP    2012-191484 A    10/2012
WO    2014/010591 A1    1/2014

OTHER PUBLICATIONS

Seiko Epson Corp., "FA-20HS Brief Sheet", Feb. 4, 2019, 2 pages.

* cited by examiner

*Primary Examiner* — Mohamed Barakat
(74) *Attorney, Agent, or Firm* — Harness, Dickey & Pierce, P.L.C.

(57) ABSTRACT

A vibration device includes a base substrate made of silicon and having a first surface and a second surface facing away from the first surface, a lid bonded to the base substrate, a vibrator disposed at the first surface of the base substrate and accommodated in a space between the base substrate and the lid, and a thermistor element disposed at the base substrate.

5 Claims, 10 Drawing Sheets

VIBRATION DEVICE, ELECTRONIC APPARATUS, AND VEHICLE

The present application is based on, and claims priority from JP Application Serial Number 2019-086584, filed Apr. 26, 2019, the disclosure of which is hereby incorporated by reference herein in its entirety.

BACKGROUND

1. Technical Field

The present disclosure relates to a vibration device, an electronic instrument, and a vehicle.

2. Related Art

The vibration device described in JP-A-2012-191484 includes an insulating substrate made of a ceramic material and having a first recess that opens via the upper surface of the insulating substrate and a second recess that opens via the lower surface of the insulating substrate, a vibrator provided at the bottom surface of the first recess, a circuit element provided at the bottom surface of the second recess and including a temperature sensor, a lid that is bonded to the upper surface of the insulating substrate and closes the opening of the first recess, and a thermally conductive member that thermally couples the circuit element to the lid.

In the vibration device described in JP-A-2012-191484, in which the circuit element and the vibrator are so disposed as to sandwich the insulating substrate made of a ceramic material having low thermal conductivity, the thermal coupling between the circuit element and the vibrator is likely to be insufficient, causing the temperature sensor not to detect an accurate temperature of the vibrator.

SUMMARY

A vibration device according to an application example of the present disclosure includes a base substrate made of silicon and having a first surface and a second surface facing away from the first surface, a lid bonded to the base substrate, a vibrator disposed at the first surface of the base substrate and accommodated in a space between the base substrate and the lid, and a thermistor element disposed at the base substrate.

An electronic instrument according to an application example of the present disclosure includes the vibration device described above, an oscillation circuit that causes the vibrator to oscillate, an A/D converter that converts an analog signal outputted by the thermistor element into a digital signal, and a processing circuit to which the digital signal outputted by the A/D converter is inputted.

A vehicle according to an application example of the present disclosure includes the vibration device described above, an oscillation circuit that causes the vibrator to oscillate, an A/D converter that converts an analog signal outputted by the thermistor element into a digital signal, and a processing circuit to which the digital signal outputted by the A/D converter is inputted.

DESCRIPTION OF EXEMPLARY EMBODIMENTS

A vibration device, an electronic instrument, and a vehicle according to aspects of the present disclosure will be described below in detail based on embodiments shown in the accompanying drawings.

First Embodiment

Figure 1:
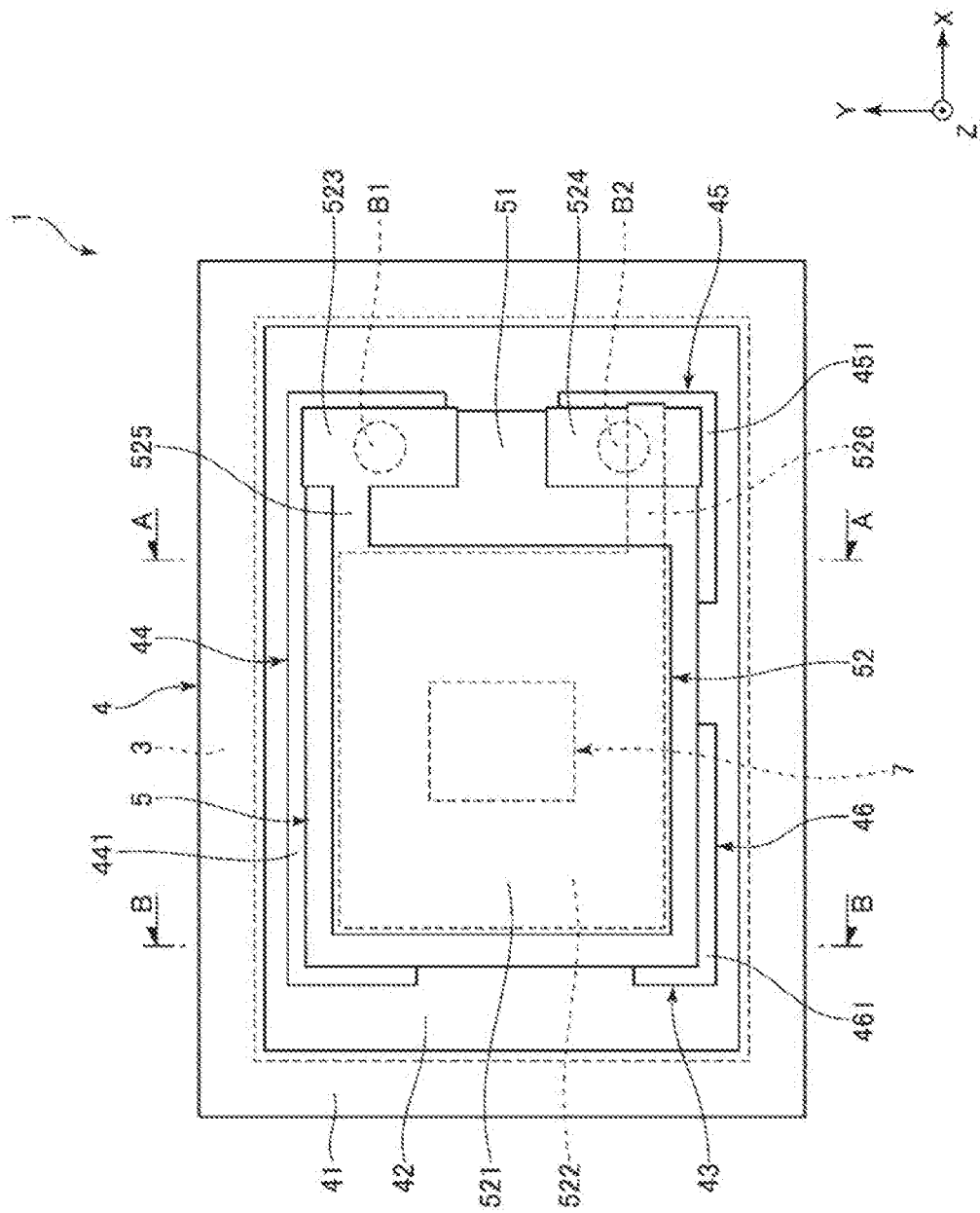
FIG. 1 is a plan view showing a vibration device according to a first embodiment.
Figure 2:
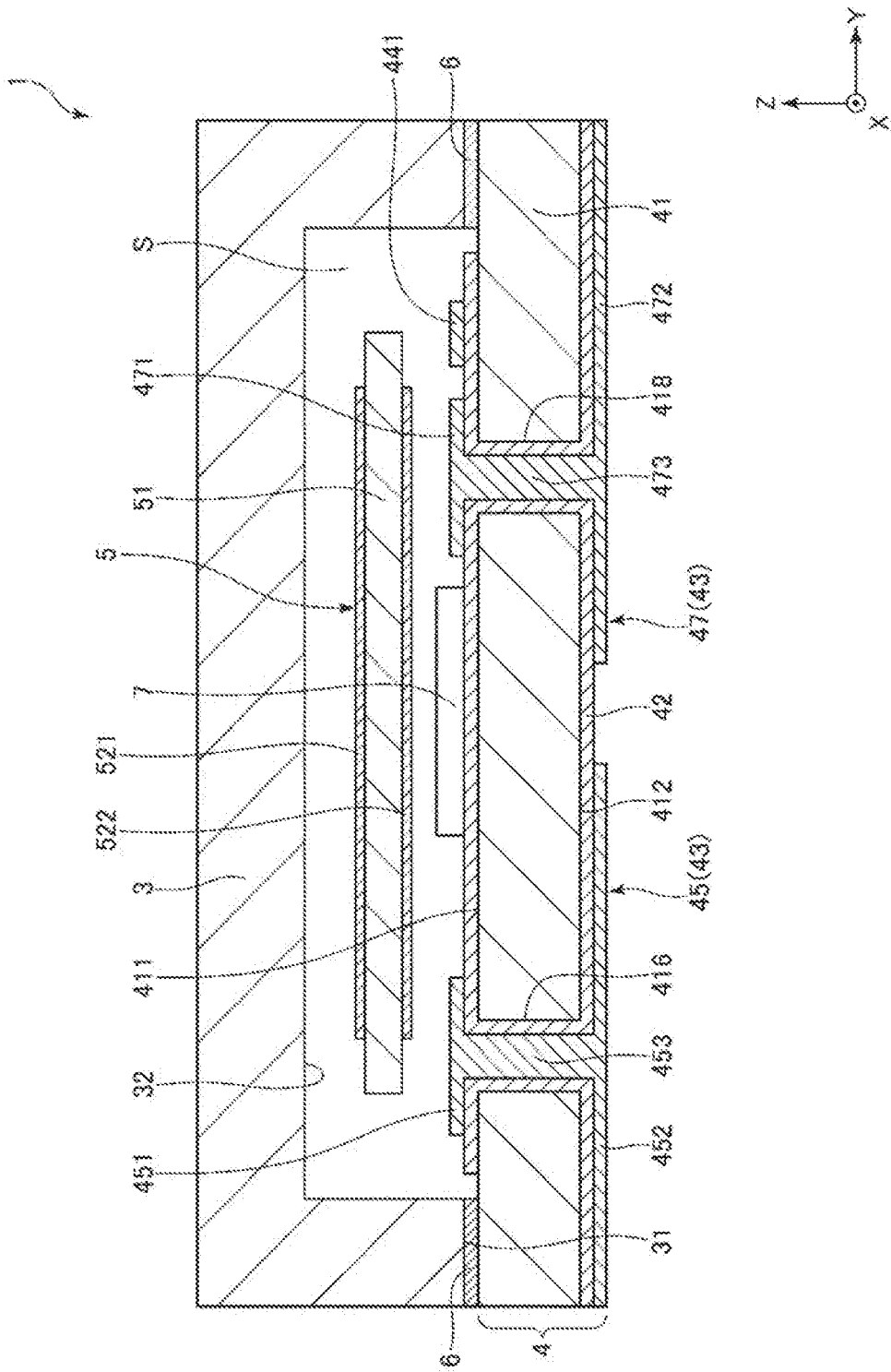
FIG. 2 is a cross-sectional view of the vibration device taken along the line A-A in FIG. 1.
Figure 3:
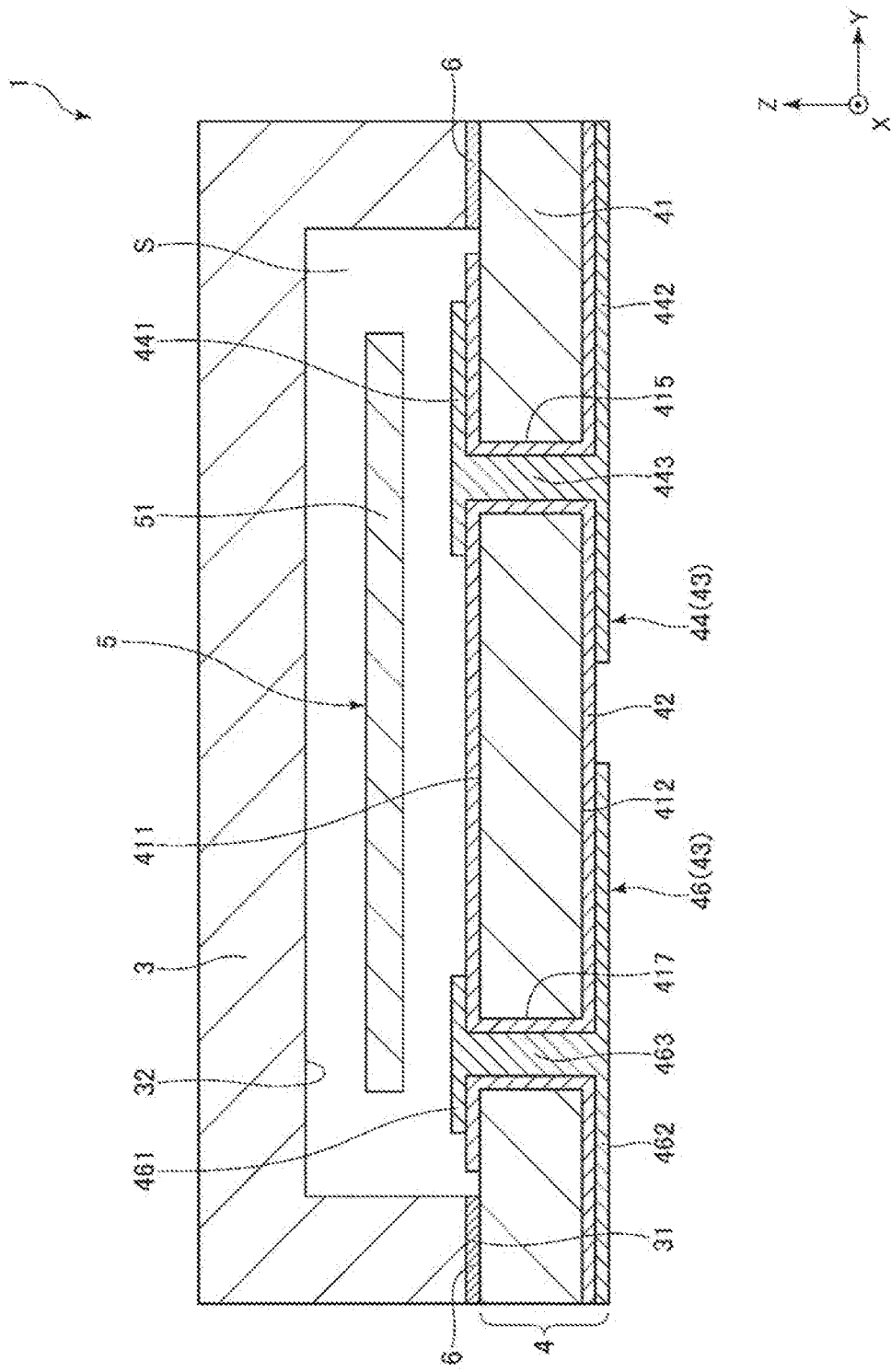
FIG. 3 is a cross-sectional view of the vibration device taken along the line B-B in FIG. 1.
Figure 4:
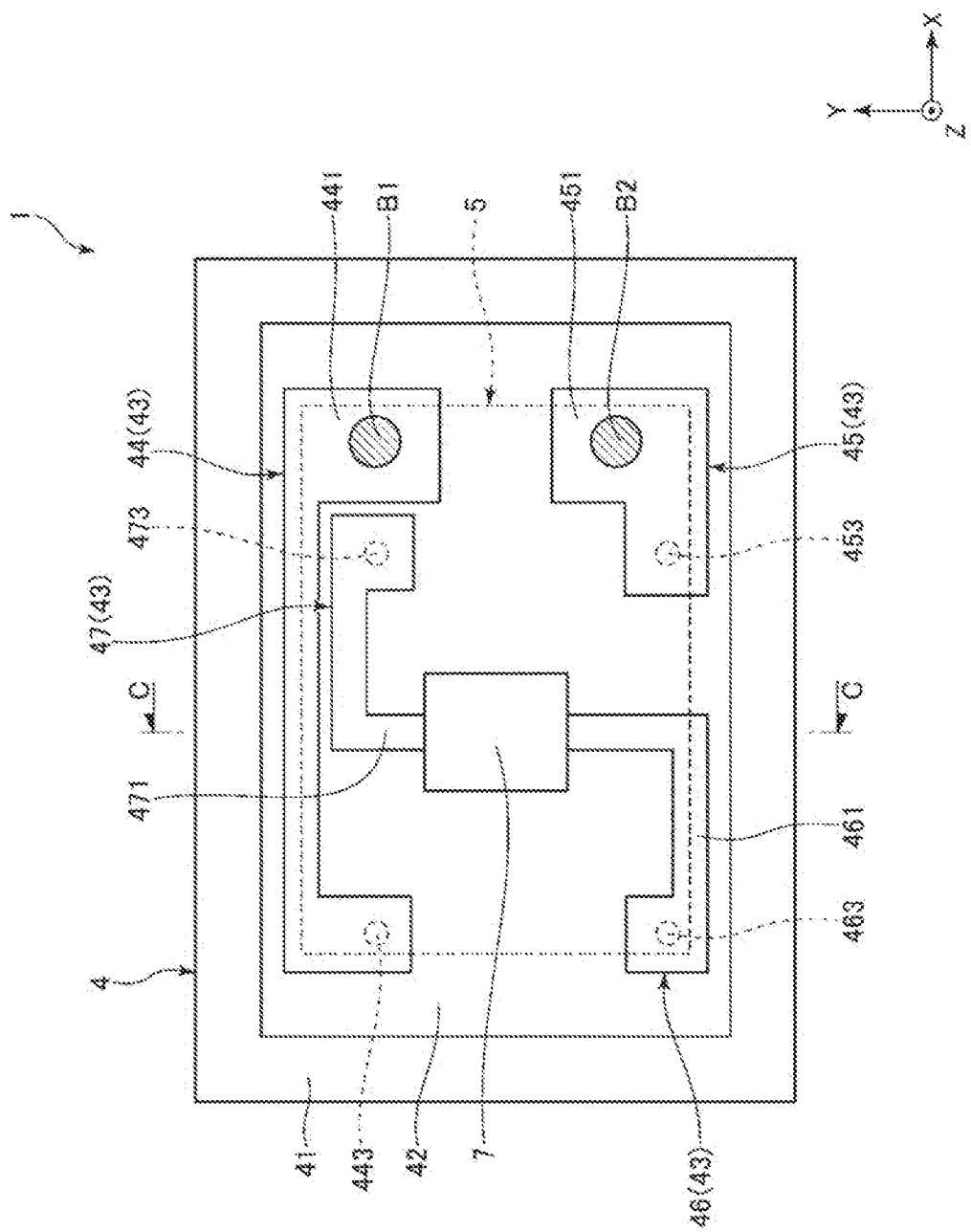
FIG. 4 is a plan view of a base provided in the vibration device shown in FIG. 1.
Figure 5:
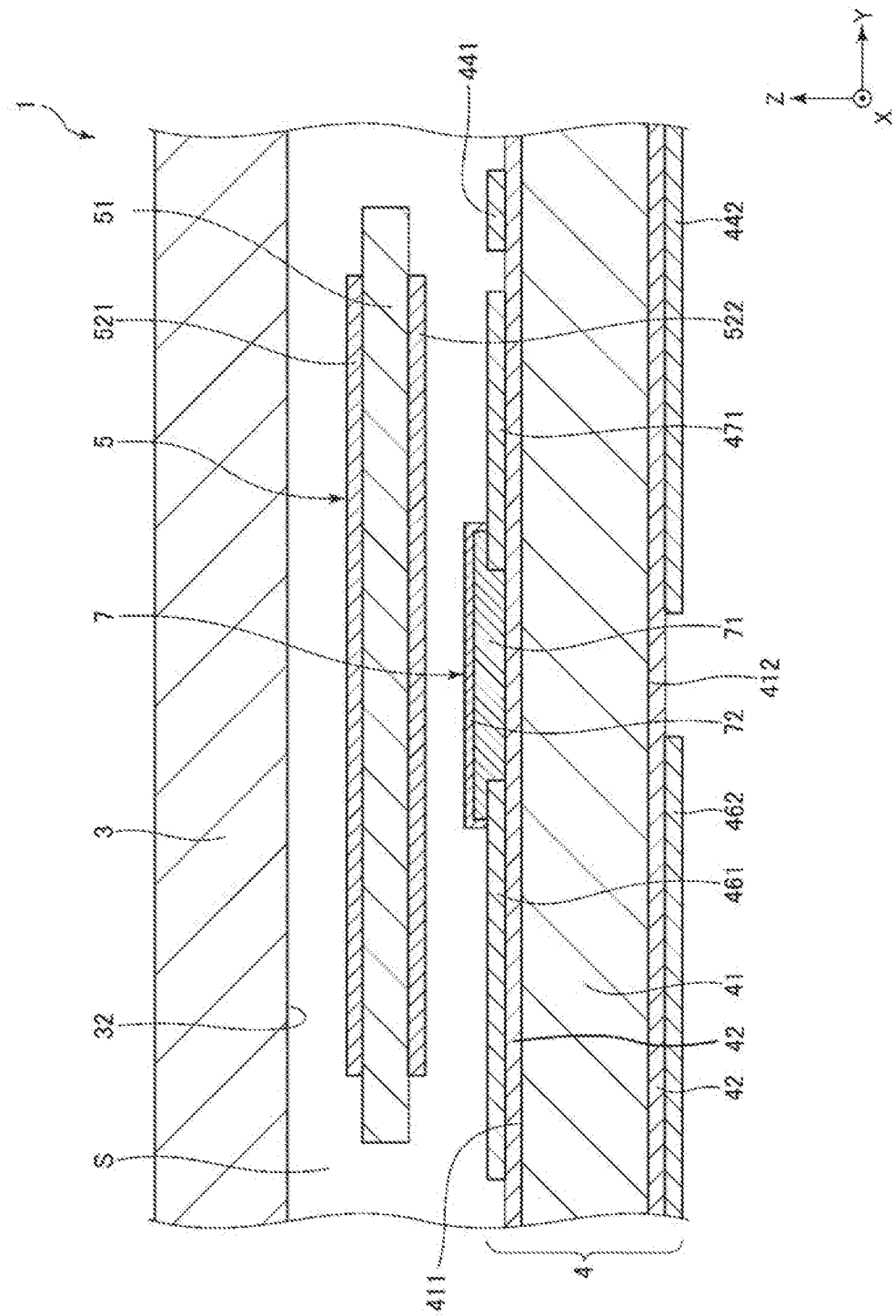
FIG. 5 is a cross-sectional view of the vibration device taken along the line C-C in FIG. 4.

FIG. 1 is a plan view showing a vibration device according to a first embodiment. FIG. 2 is a cross-sectional view of the vibration device taken along the line A-A in FIG. 1. FIG. 3 is a cross-sectional view of the vibration device taken along the line B-B in FIG. 1. FIG. 4 is a plan view of a base provided in the vibration device shown in FIG. 1. FIG. 5 is a cross-sectional view of the vibration device taken along the line C-C in FIG. 4. The figures described above show axes X, Y, and Z, which are three axes perpendicular to one another, for convenience of description. Further, the side facing the front end of the arrow of the axis Z is also called an "upper side," and the side facing the base end of the arrow of the axis Z is also called "a lower side." A plan view viewed along the thickness direction of a base substrate, that is, the axis Z is also simply referred to as a "plan view."

A vibration device 1 shown in FIG. 1 includes a base 4, a vibrator 5 provided above the upper surface of the base 4, a lid 3 so bonded to the base 4 as to accommodate the vibrator 5, and a thermistor element 7 provided on the base 4.

The base 4 includes a base substrate 41 having a plate-like shape, an insulating layer 42 disposed on the surface of the base substrate 41, and an electrode 43 disposed on the insulating layer 42, as shown in FIGS. 2 and 3. The base substrate 41 has an upper surface 411 as a first surface and a lower surface 412 as a second surface facing away from the upper surface 411. The base substrate 41 further includes four through holes 415, 416, 417, and 418, which pass through the upper surface 411 and the lower surface 412.

The thus configured base substrate 41 is made of silicon. The vibration device 1 can therefore be formed in a semiconductor process. The vibration device 1 can therefore be precisely manufactured and reduced in size. Further, the base 41 made of silicon has sufficiently high thermal conductivity. The vibrator 5 and the thermistor element 7 can therefore be thermally coupled to each other via the base 4, as will be described later.

The insulating layer 42 covers the surface of the base substrate 41 except an outer edge portion of the upper surface 411, that is, the portion where the base 4 is bonded to the lid 3. The thus configured insulating layer 42 is formed of a silicon oxide film ($SiO_2$ film). A method for forming the insulating layer 42 is not limited to a specific method, and the insulating layer 42 may be formed, for example, by thermally oxidizing the surface of the base substrate 41 or formed in a plasma CVD process using tetraethoxysilane (TEOS). The insulating layer 42 is not necessarily made of a specific material and may be made, for example, of an insulating resin material, such as polyimide, or may be formed of a composite element made of different materials layered on each other.

The electrode 43 is provided on the insulating layer 42. The electrode 43 includes a first wiring 44 and a second wiring 45 electrically coupled to the vibrator 5 and a third wiring 46 and a fourth wiring 47 electrically coupled to the thermistor element 7.

The first wiring 44 includes an internal electrode 441 provided on the upper surface 411 of the base substrate 41, an external electrode 442 provided on the lower surface 412 of the base substrate 41, and a through electrode 443, which is disposed in the through hole 415 and electrically couples the internal electrode 441 and the external electrode 442 to each other. Similarly, the second wiring 45 includes an internal electrode 451 provided on the upper surface 411 of the base substrate 41, an external electrode 452 provided on the lower surface 412 of the base substrate 41, and a through electrode 453, which is disposed in the through hole 416 and electrically couples the internal electrode 451 and the external electrode 452 to each other.

The third wiring 46 includes an internal electrode 461 provided on the upper surface 411 of the base substrate 41, an external electrode 462 provided on the lower surface 412 of the base substrate 41, and a through electrode 463, which is disposed in the through hole 417 and electrically couples the internal electrode 461 and the external electrode 462 to each other. Similarly, the fourth wiring 47 includes an internal electrode 471 provided on the upper surface 411 of the base substrate 41, an external electrode 472 provided on the lower surface 412 of the base substrate 41, and a through electrode 473, which is disposed in the through hole 418 and electrically couples the internal electrode 471 and the external electrode 472 to each other.

The first to fourth wirings 44 to 47 are not necessarily made of a specific material and can be made, for example, of a metal material, such as gold (An), silver (Ag), platinum (Pt), palladium (Pd), iridium (Ir), copper (Cu), aluminum (Al), nickel (Ni), chromium (Cr), titanium (Ti), and tungsten (W), or an alloy containing any combination of the metal materials.

The lid 3 has a box-like shape having a bottomed recess 32, which opens through a lower surface 31 of the lid 3. The lower surface 31 of the lid 3 is directly bonded to the upper surface 411 of the base substrate 41 via a bonding member 6. In the present embodiment, the lid 3 and the base substrate 41 are bonded to each other by using, among a variety of direct bonding methods, diffusion bonding using diffusion of metals. The method for bonding the lid 3 and the base 4 to each other is not limited to a specific method and can be anodic bonding.

Direct bonding other than the diffusion bonding can be surface activation bonding. To use surface activation bonding, the lower surface 31 of the lid 3 and the upper surface 411 of the base substrate 41 are activated by irradiating the lower surface 31 and the upper surface 411 with an inert gas, such as Ar, and the activated lower surface 31 and upper surface 411 can then attached and bonded to each other.

According to the surface activation bonding, the lid 3 and the base substrate 41 can be bonded to each other at room temperature, and stress is therefore unlikely to be left in a package formed of the lid 3 and the base substrate 41. Further, since the lid 3 and the base substrate 41 can be bonded to each other with no bonding member, such as an adhesive and a metal film, the height of the package can be reduced.

The thus configured lid 3 is made of silicon. The base substrate 41 and the lid 3 can therefore be made of the same material, whereby the difference in coefficient of thermal expansion therebetween can be substantially zero. The resultant vibration device 1 thus has excellent vibration characteristics with thermal stress resulting from thermal expansion suppressed. It is, however, noted that the lid 3 is not necessarily made of a specific material and can be made, for example, of any of a variety of semiconductor materials excluding silicon, any of a variety of ceramic materials, or any of a variety of glass materials.

An accommodation space S, which accommodates the vibrator 5, is formed between the lid 3 and the base 4. The accommodation space S is so hermetically sealed that a reduced-pressure state, preferably a state closer to a vacuum, is achieved. The vibrator 5 thus has improved vibration characteristics. It is, however, noted that the accommodation space S does not necessarily have a specific atmosphere. For example, the accommodation space S may have an atmosphere formed of an encapsulated inert gas, such as nitrogen or Ar, and may not have a reduced-pressure state but may have an atmospheric-pressure state or an increased-pressure state.

The vibrator 5 includes a vibration substrate 51 and an electrode 52 disposed on a surface of the vibration substrate 51, as shown in FIG. 1. The vibration substrate 51 has a thickness-shear vibration mode and is formed of an AT-cut quartz crystal substrate in the present embodiment. An AT-cut quartz crystal substrate has tertiary frequency-temperature characteristics and therefore allows a vibrator 5 to have excellent temperature characteristics.

The electrode 52 includes an excitation electrode 521 disposed on the upper surface of the vibration substrate 51 and an excitation electrode 522 so disposed on the lower surface of the vibration substrate 51 as to face the excitation electrode 521 via the vibration substrate 51. The electrode 52 further includes a pair of terminals 523 and 524 disposed on the lower surface of the vibration substrate 51, a wiring 525, which electrically couples the terminal 523 to the excitation electrode 521, and a wiring 526, which electrically couples the terminal 524 to the excitation electrode 522.

The configuration of the vibrator 5 is not limited to the configuration described above. For example, the vibrator 5 may be a mesa type device in which the vibrating region sandwiched between the excitation electrodes 521 and 522 protrudes from the portion therearound or an inverted mesa type device in which the vibrating region retracts from the portion therearound. The vibrator 5 may still instead undergo bevel processing of grinding the circumference of the vibration substrate 51 to chamber the corners thereof or convex processing of converting each of the upper and lower surfaces of the vibration substrate 51 into a convex curved surface.

The vibrator 5 does not necessarily vibrate in the thickness-shear vibration mode and may, for example, be a tuning fork type vibrator including two vibrating arms that vibrate in the plane containing the vibrating arms in such a way that a tuning fork vibrates. Still instead, the vibrator 5 may be a gyro sensor device that includes a drive arm that undergoes drive vibration and a detection arm that undergoes detection vibration and detects angular velocity or an acceleration sensor device that includes a detector that detects acceleration. The vibration substrate 51 is not limited to an AT-cut quartz crystal substrate and may be a quartz crystal substrate excluding an AT-cut quartz crystal substrate, for example, an X-cut quartz crystal substrate, a Y-cut quartz crystal substrate, a Z-cut quartz crystal substrate, a BT-cut quartz crystal substrate, an SC-cut quartz crystal substrate, or an ST-cut quartz crystal substrate. Further, in the present embodiment, the vibration substrate 51 is made of quartz crystal, but not necessarily, and may be made, for example, of piezoelectric single crystal, such as lithium niobite, lithium tantalate, lithium tetraborate, langasite crystal, potassium niobite, and gallium phosphate, or any other piezoelectric single crystal. Still instead, the vibrator 5 is not limited to a piezoelectrically driven vibrator and may be an electrostatically driven vibrator using electrostatic force.

The thus formed vibrator 5 is fixed to the upper surface of the base 4 via electrically conductive bonding members B1 and B2, as shown in FIG. 1. The electrically conductive bonding member B1 electrically couples the internal electrode 441 to the terminal 523, and the electrically conductive bonding member B2 electrically couples the internal electrode 451 to the terminal 524. The first and second wirings 44, 45 are thus electrically coupled to the vibrator 5.

The electrically conductive bonding members B1 and B2 are not necessarily each formed of a specific component and can be formed of any component having both electric conductivity and bondability, for example, any of a variety of metal bumps, such as a gold bump, a silver bump, a copper bump, and a solder bump, or an electrically conductive adhesive formed of any of a variety of adhesives, such as a polyimide-based, epoxy-based, silicone-based, and acrylic adhesives, having electrically conductive fillers, such as silver fillers, diffused therein. Using a metal bump, which is the former example, as each of the electrically conductive bonding members B1 and B2 allows suppression of generation of a gas from the electrically conductive bonding members B1 and B2, whereby a change in the environment in the accommodation space S, particularly, an increase in pressure therein can be effectively suppressed. On the other hand, using an electrically conductive adhesive, which is the latter example, as each of the electrically conductive bonding members B1 and B2 allows the electrically conductive bonding members B1 and B2 to be softer than when a metal bump is used, so that stress is unlikely to be induced in the vibrator 5.

The thermistor element 7 functions as a temperature sensor that detects the temperature of the vibrator 5 and is provided on the base 4, as shown in FIGS. 4 and 5. The thermistor element 7 is therefore thermally coupled to the vibrator 5 via the base 4 and the electrically conductive bonding members B1 and B2. The base substrate 41, which also serves as the base material of the base 4, is made of silicon, and the thermal conductivity of silicon is about 170 W/m·k. The base 4 therefore has sufficiently high thermal conductivity and can efficiently thermally couples the thermistor element 7 to the vibrator 5. As a result, a difference in temperature between the thermistor element 7 and the vibrator 5 is unlikely to occur, whereby the thermistor element 7 can more accurately detect the temperature of the vibrator 5.

The thermistor element 7 is disposed on the side facing the upper surface 411 of the base substrate 41, that is, on the upper surface of the base 4 and is electrically coupled to the internal electrodes 461 and 471. When the thermistor element 7 is disposed on the upper surface of the base 4 as described above, the thermistor element 7 and the vibrator 5 can be so disposed as to be closer to each other. The thermistor element 7 can therefore more accurately detect the temperature of the vibrator 5.

The thermistor element 7 has a portion that overlaps with the vibrator 5 in the plan view. That is, part or entirety of the thermistor element 7 overlaps with the vibrator 5 in the plan view. The thermistor element 7 and the vibrator 5 can therefore be so disposed as to be further closer to each other. The thermistor element 7 can therefore still more accurately detect the temperature of the vibrator 5. Further, an increase in size of the vibration device 1 along each of the axes X and Y can be suppressed, whereby the size of the vibration device 1 can be reduced. In particular, the thermistor element 7 entirely overlaps with the vibrator 5 in the present embodiment, whereby the effect described above can be markedly provided. It is, however, noted that the configuration described above is not necessarily employed, and part of the thermistor element 7 may overlap with the vibrator 5, or the thermistor element 7 may not entirely overlap with the vibrator 5.

The four through electrodes 443 to 473, which pass through the base substrate 41, are provided, as described above. The through electrodes 443 to 473 are made of a metal material (including alloy) and therefore have thermal conductivity higher than that of the base substrate 41. Burying the through electrodes 443 to 473 in the base substrate 41 therefore further improves the thermal conduction of the base 4, whereby a difference in temperature between the thermistor element 7 and the vibrator 5 is further unlikely to occur. The thermistor element 7 can thus more accurately detect the temperature of the vibrator 5.

The first and second wirings 44, 45, which are electrically coupled to the vibrator 5, and the third and fourth wirings 46, 47, which are electrically coupled to the thermistor element 7, have the same configuration, as described above. That is, the first to fourth wirings 44 to 47 are each formed of an internal electrode provided on the upper surface 411, an external electrode provided on the lower surface 412, and a through electrode that couples the internal and external electrodes to each other. The conductivity of external heat to the vibrator 5 is therefore substantially the same as that to the thermistor element 7. The difference in temperature between the vibrator 5 and the thermistor element 7 can therefore be reduced to a small value irrespective of the environmental temperature.

The thermistor element 7 is not limited to a specific component and is a thin-film thermistor element in the present embodiment. The size of the thermistor element can thus be reduced. The thus configured thermistor element 7 includes a thermistor thin film 71, which is so provided on the insulating layer 42 as to overlap with the internal electrodes 461 and 471, and a passivation film 72, which covers the thermistor thin film 71, as shown in FIG. 5.

As described above, the thermistor thin film 71 is so provided as to overlap with part of the internal electrodes 461 and 471, which are in contact with the base 4. The internal electrodes 461 and 471 are made of a metal and so disposed as to be in contact with the base 4, whereby heat is likely to be transferred from the base 4 to the internal electrodes 461 and 471. Since the thermistor thin film 71 is so provided as to overlap with part of the internal electrodes 461 and 471, heat is likely to be transferred from the internal electrodes 461 and 471 to the thermistor thin film 71. As a result, the difference in temperature between the thermistor thin film 71 and the vibrator 5, which is disposed on the base 4, can be suppressed to a small value.

Further, since part of the thermistor thin film 71 is so disposed as to be in contact with the base 4, heat is likely to be transferred from the base 4 to the thermistor thin film 71, resulting in a small difference in temperature between the thermistor thin film 71 and the vibrator 5, which is disposed on the base 4.

The thermistor thin film 71 is, for example, a composite metal oxide film made of a composite metal oxide primarily made of an Mn—Co-based composite metal oxide containing at least one of nickel (Ni), iron (Fe), and copper (Cu) and has a Spinel crystal structure. On the other hand, the passivation film 72 is formed, for example, of a silicon oxide ($SiO_2$) film. It is, however, noted that the thermistor thin film 71 and the passivation film 72 are not each necessarily made of a specific materials.

The vibration device 1 has been described above. The thus configured vibration device 1 includes the base substrate 41, which is made of silicon and has the upper surface 411 as the first surface and the lower surface 412 as the second surface facing away from the upper surface 411, the lid 3 bonded to the base substrate 41, the vibrator 5, which is disposed on the upper surface 411 of the base substrate 41 and accommodated in the space between the base substrate 41 and the lid 3, and the thermistor element 7, which is disposed on the base substrate 41, as described above. The thermistor element 7 and the vibrator 5 can thus be thermally coupled to each other via the base substrate 41. Since the base substrate 41 is made of silicon and the thermal conductivity of silicon is about 170 W/m·k, which is sufficiently high, the thermistor element 7 and the vibrator 5 can be efficiently thermally coupled to each other. As a result, a difference in temperature between the thermistor element 7 and the vibrator 5 is unlikely to occur, whereby the thermistor element 7 can accurately detect the temperature of the vibrator 5.

The thermistor element 7 is disposed on the upper surface 411 of the base substrate 41, as described above. The thermistor element 7 and the vibrator 5 can therefore be so disposed as to be closer to each other. The thermistor element 7 can therefore accurately detect the temperature of the vibrator 5.

The thermistor element 7 has a portion that overlaps with the vibrator 5 in the plan view along the thickness direction of the base substrate 41, as described above. The thermistor element 7 and the vibrator 5 can therefore be so disposed as to be closer to each other. The thermistor element 7 can therefore accurately detect the temperature of the vibrator 5.

Second Embodiment

Figure 6:
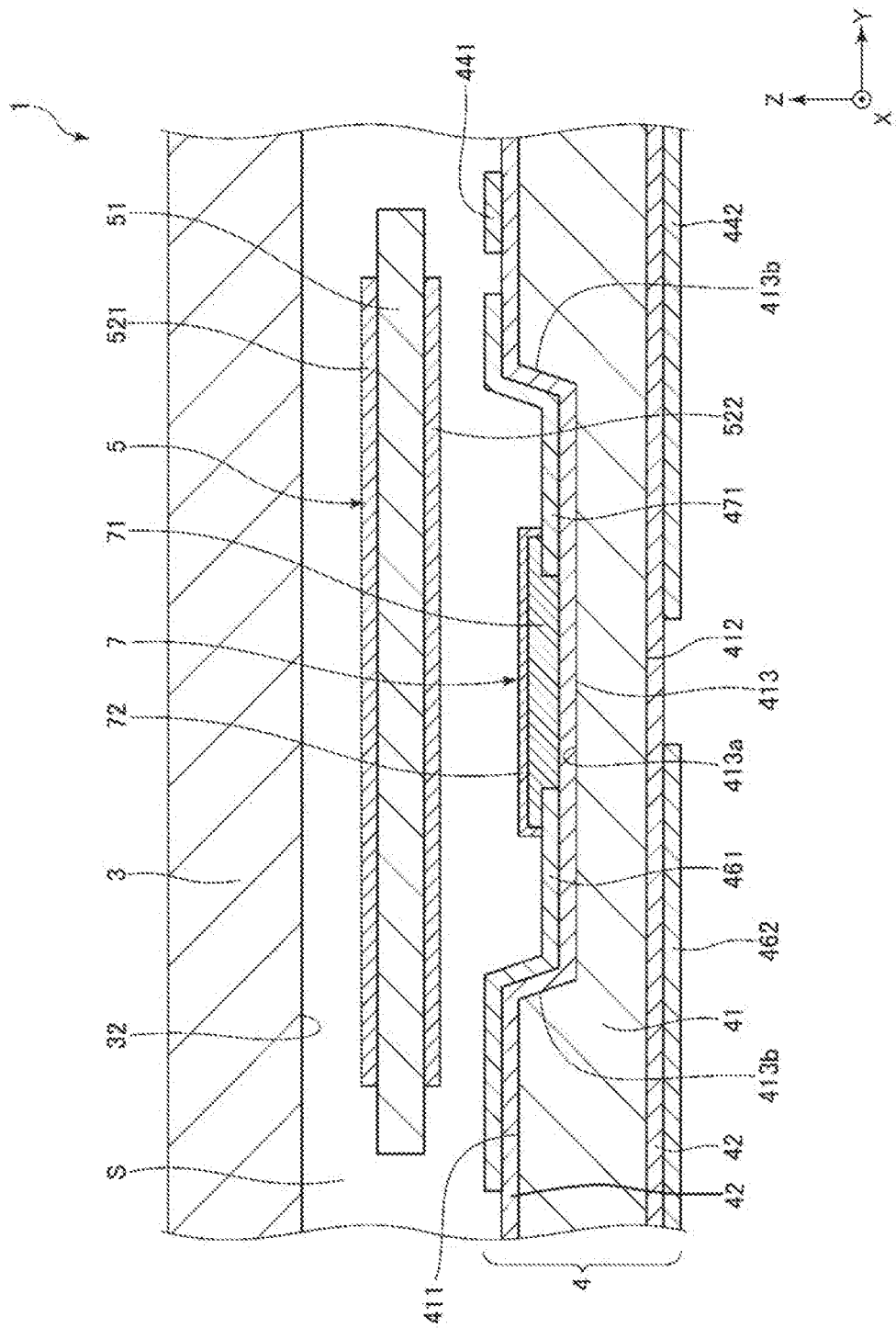
FIG. 6 is a cross-sectional view showing a vibration device according to a second embodiment.

FIG. 6 is a cross-sectional view showing a vibration device according to a second embodiment. FIG. 6 is a cross-sectional view corresponding to the cross section of the vibration device taken along the line C-C in FIG. 4.

The vibration device 1 according to the present embodiment is the same as the vibration device 1 according to the first embodiment described above except that the base substrate 41 is configured differently. In the following description, the vibration device 1 according to the second embodiment will be described primarily on the difference from the vibration device 1 according to the first embodiment described above, and the same items will not be described. Further, in FIG. 6, the same configurations as those in the embodiment described above have the same reference characters.

The base substrate 41 has a recess 413, which opens via the upper surface 411 of the base substrate 41, as shown in FIG. 6. The thermistor element 7 is provided on a bottom surface 413a of the recess 413. The height of the vibration device 1 can thus be reduced, as compared, for example, with the first embodiment described above.

The side surface of the recess 413 is an inclining surface 413b, which inclines with respect to the thickness direction of the base substrate 41, that is, the axis Z, and the inclining surface 413b gently connects the bottom surface 413a to the upper surface 411. The internal electrodes 461 and 471, which are electrically coupled to the thermistor element 7, are so provided as to extend along the bottom surface 413a, the inclining surface 413b, and the upper surface 411. In other words, the internal electrodes 461 and 471 are extended from the bottom surface 413a to the upper surface 411 via the inclining surface 413b. The inclining surface 413b, which is the side surface of the recess 413, can effectively prevent the internal electrodes 461 and 471, which extend along the side surface, from being cut and decoupled.

As described above, in the vibration device 1 according to the present embodiment, the base substrate 41 has the recess 413, which opens via the upper surface 411, which is the first surface, and the thermistor element 7 is disposed on the bottom surface 413a of the recess 413. The height of the vibration device 1 can thus be reduced, as compared, for example, with the first embodiment described above.

The vibration device 1 includes the internal electrodes 461 and 471 as wirings electrically coupled to the thermistor element 7, as described above. The side surface of the recess 413 is the inclining surface 413b, which inclines with respect to the thickness direction of the base substrate 41. The internal electrodes 461 and 471 are disposed on the bottom surface 413a, the inclining surface 413b, and the upper surface 411, which is the first surface. The inclining surface 413b, which is the side surface of the recess 413, can effectively prevent the internal electrodes 461 and 471 from being cut and decoupled.

The second embodiment described above can also provide the same effects as those provided by the first embodiment described above.

Third Embodiment

Figure 7:
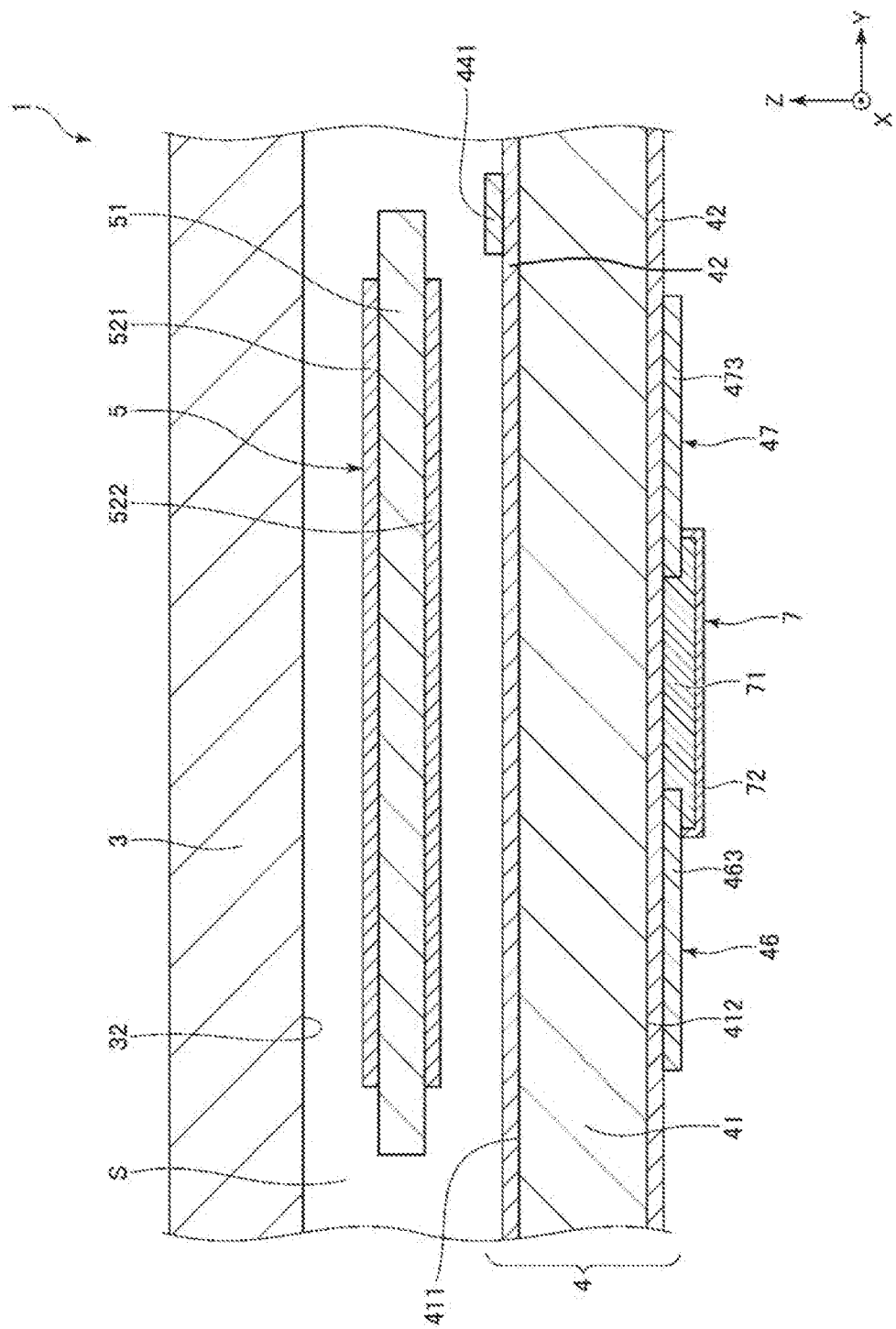
FIG. 7 is a cross-sectional view showing a vibration device according to a third embodiment.

FIG. 7 is a cross-sectional view showing a vibration device according to a third embodiment. FIG. 7 is a cross-sectional view corresponding to the cross section of the vibration device taken along the line C-C in FIG. 4.

The vibration device 1 according to the present embodiment is the same as the vibration device 1 according to the first embodiment described above except that the thermistor element 7 is disposed differently. In the following description, the vibration device 1 according to the third embodiment will be described primarily on the difference from the vibration device 1 according to the first embodiment described above, and the same items will not be described. Further, in FIG. 7, the same configurations as those in the embodiments described above have the same reference characters.

The thermistor element 7 is disposed on the lower surface 412 of the base substrate 41, as shown in FIG. 7. The configuration described above also allows the thermistor element 7 and the vibrator 5 to be thermally coupled to each other via the base substrate 41. As a result, a difference in temperature between the thermistor element 7 and the vibrator 5 is unlikely to occur, whereby the thermistor element 7 can accurately detect the temperature of the vibrator 5.

The third embodiment described above can also provide the same effects as those provided by the first embodiment described above.

Fourth Embodiment

Figure 8:
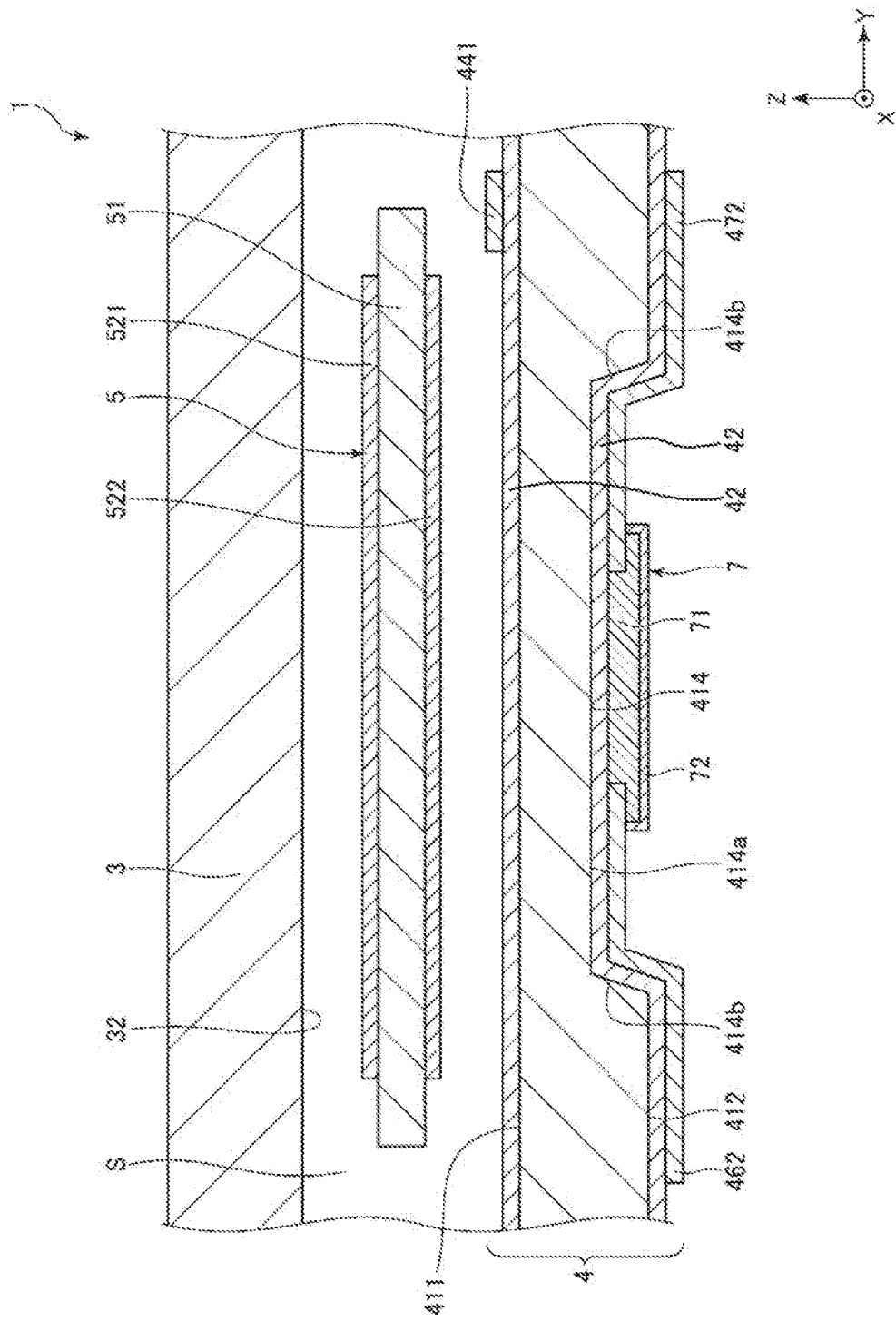
FIG. 8 is a cross-sectional view showing a vibration device according to a fourth embodiment.

FIG. 8 is a cross-sectional view showing a vibration device according to a fourth embodiment. FIG. 8 is a cross-sectional view corresponding to the cross section of the vibration device taken along the line C-C in FIG. 4.

The vibration device 1 according to the present embodiment is the same as the vibration device 1 according to the third embodiment described above except that the base substrate 41 is configured differently. In the following description, the vibration device 1 according to the fourth embodiment will be described primarily on the difference from the vibration device 1 according to the third embodiment described above, and the same items will not be described. Further, in FIG. 8, the same configurations as those in the embodiments described above have the same reference characters.

The base substrate 41 has a recess 414, which opens via the lower surface 412 of the base substrate 41, as shown in FIG. 8. The thermistor element 7 is provided on a bottom surface 414a of the recess 414. The height of the vibration device 1 can thus be reduced, as compared, for example, with the first embodiment described above. In addition to the arrangement described above, the internal electrodes 461 and 471 and the through electrodes 463 and 473 are omitted from the third and fourth wirings 46, 47, and the external electrodes 462 and 472 are electrically coupled to the thermistor element 7.

The side surface of the recess 414 is an inclining surface 414b, which inclines with respect to the thickness direction of the base substrate 41, that is, the axis Z, and the inclining surface 414b gently connects the bottom surface 414a to the lower surface 412. The external electrodes 462 and 472, which are electrically coupled to the thermistor element 7, are so provided as to extend along the bottom surface 414a, the inclining surface 414b, and the lower surface 412. In other words, the external electrodes 462 and 472 are extended from the bottom surface 414a to the lower surface 412 via the inclining surface 414b. The inclining surface 414b, which is the side surface of the recess 414, can effectively prevent the external electrodes 462 and 472, which extend along the side surface, from being cut and decoupled.

As described above, in the vibration device 1 according to the present embodiment, the base substrate 41 has the recess 414, which opens via the lower surface 412, which is the second surface, and the thermistor element 7 is disposed on the bottom surface 414a of the recess 414. The height of the vibration device 1 can thus be reduced, as compared, for example, with the third embodiment described above.

The vibration device 1 includes the external electrodes 462 and 472 as wirings electrically coupled to the thermistor element 7, as described above. The side surface of the recess 414 is the inclining surface 414b, which inclines with respect to the thickness direction of the base substrate 41. The external electrodes 462 and 472 are so disposed as to extend along the bottom surface 414a, the inclining surface 414b, and the lower surface 412, which is the second surface. The inclining surface 414b, which is the side surface of the recess 414, can effectively prevent the external electrodes 462 and 472 from being cut and decoupled.

The fourth embodiment described above can also provide the same effects as those provided by the first embodiment described above.

Fifth Embodiment

Figure 9:
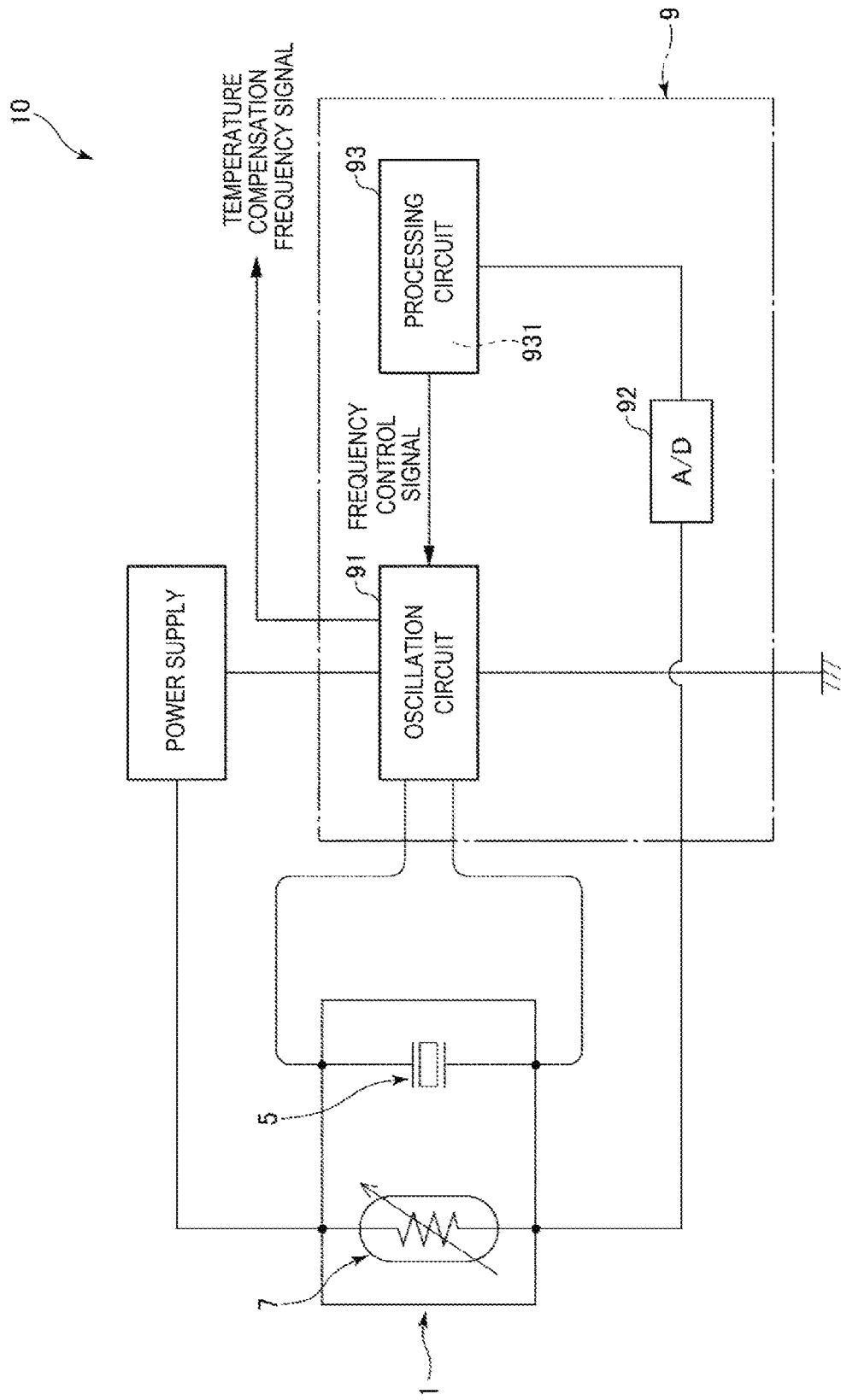
FIG. 9 is a block diagram showing the circuit configuration of an electronic instrument according to a fifth embodiment.

FIG. 9 is a block diagram showing the circuit configuration of an electronic instrument according to a fifth embodiment.

An electronic instrument 10 includes the vibration device 1 and a circuit 9, which is electrically coupled to the vibration device 1, as shown in FIG. 9. The circuit 9 includes an oscillation circuit 91, which causes the vibrator 5 to oscillate, an A/D converter 92, which converts an analog signal (temperature information) outputted by the thermistor element 7 into a digital signal, and a processing circuit 93, to which the digital signal outputted by the A/D converter 92 is inputted. The processing circuit 93 includes a temperature compensation circuit 931, which produces a frequency control signal based on the digital signal outputted by the A/D converter 92 and outputs the frequency control signal to the oscillation circuit 91. The oscillation circuit 91 produces a temperature compensation frequency signal based on the frequency control signal and outputs the temperature compensation frequency signal.

The electronic instrument 10 is used as an oscillator and can be built in, for example, a personal computer, a digital still camera, a smartphone, a tablet terminal, a timepiece, an inkjet printer, a television receiver, a head mounted display (HMD), a video camera, a car navigator, a pager, an electronic dictionary, a desktop calculator, an electronic game console, a workstation, a POS terminal, a medical instrument (electronic thermometer, blood pressure gauge, blood sugar meter, electrocardiograph, ultrasonic diagnostic apparatus, and electronic endoscope, for example), a fish finder, a variety of measuring instruments, an instrument for mobile terminal/base station, a variety of meters (meters for car, airplane, and ship, for example), a flight simulator, and a network server.

As described above, the electronic instrument 10 includes the vibration device 1, the oscillation circuit 91, which causes the vibrator 5 to oscillate, the A/D converter 92, which converts the analog signal outputted by the thermistor element 7 into a digital signal, and the processing circuit 93, to which the digital signal outputted by the A/D converter 92 is inputted. The electronic instrument 10 can therefore benefit from the above-mentioned effects provided by the vibration device 1 and hence has high reliability.

The configuration of the electronic instrument 10 is not limited to a specific configuration. For example, the processing circuit 93 may not produce the frequency control signal based on the digital signal outputted by the A/D converter 92 or output the frequency control signal to the oscillation circuit 91. That is, the digital signal outputted by the A/D converter 92 may not be used for the frequency compensation.

Sixth Embodiment

Figure 10:
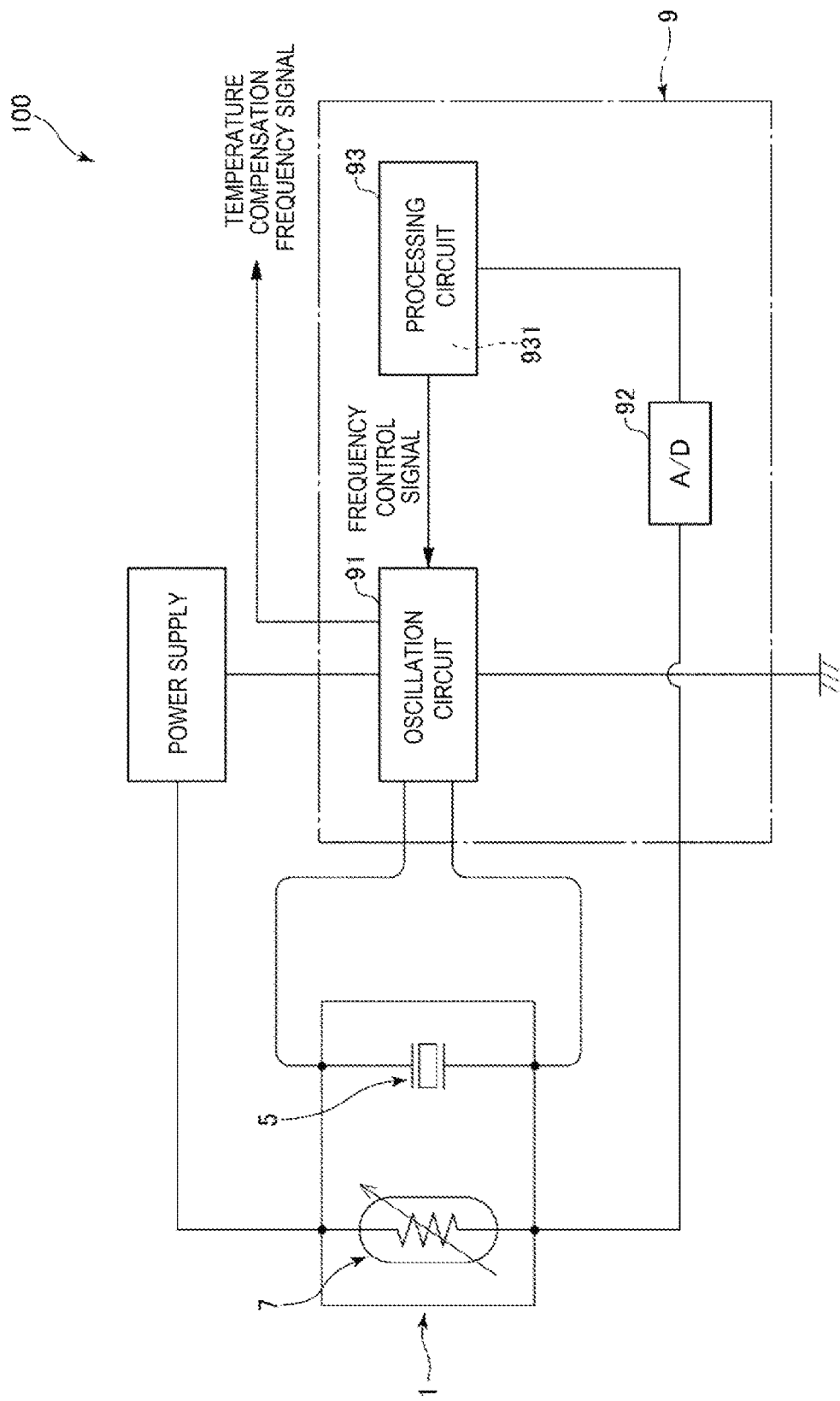
FIG. 10 is a block diagram showing the circuit configuration of a vehicle according to a sixth embodiment.

FIG. 10 is a block diagram showing the circuit configuration of a vehicle according to a sixth embodiment.

An automobile 100 as the vehicle shown in FIG. 10 includes the vibration device 1 and the circuit 9, which is electrically coupled to the vibration device 1. The circuit includes the oscillation circuit 91, which causes the vibrator 5 to oscillate, the A/D converter 92, which converts the analog signal (temperature information) outputted by the thermistor element 7 into a digital signal, and the processing circuit 93, to which the digital signal outputted by the A/D converter 92 is inputted. The processing circuit 93 includes the temperature compensation circuit 931, which produces the frequency control signal based on the digital signal outputted by the A/D converter and outputs the frequency control signal to the oscillation circuit 91. The oscillation circuit 91 produces the temperature compensation frequency signal based on the frequency control signal and outputs the temperature compensation frequency signal.

The vibration device 1 is used as an oscillator and is used, for example, to control the following components built in the automobile 100: a keyless entry system; an immobilizer; a car navigation system; a car air conditioner; an anti-lock braking system (ABS); an airbag; a tire pressure monitoring system (TPMS); an engine control system; and an electronic control unit (ECU), such as a system that monitors the battery in a hybrid automobile and an electric automobile and a vehicle attitude control system.

As described above, the automobile 100 as the vehicle includes the vibration device 1, the oscillation circuit 91, which causes the vibrator 5 to oscillate, the A/D converter 92, which converts the analog signal outputted by the thermistor element 7 into a digital signal, and the processing circuit 93, to which the digital signal outputted by the A/D converter 92 is inputted. The automobile 100 can therefore benefit from the above-mentioned effects provided by the vibration device 1 and hence has high reliability.

The configuration of the automobile 100 is not limited to a specific configuration. For example, the processing circuit 93 may not produce the frequency control signal based on the digital signal outputted by the A/D converter 92 or output the frequency control signal to the oscillation circuit 91. That is, the digital signal outputted by the A/D converter 92 may not be used for the frequency compensation. The vehicle is not limited to the automobile 100 and may instead, for example, be an airplane, a ship, an automated guided vehicle (AGV), a bipedal walking robot, and a drone or any other unmanned airplane.

The vibration device, the electronic instrument, and the vehicle according to the present application examples have been described above with reference to the embodiments in the drawings, but the present application examples are not limited thereto, and the configuration of each portion can be replaced with an arbitrary configuration having the same function. Further, an arbitrarily configuration may be added to any of the present application examples. In the present application examples, arbitrary two or more configurations shown in the embodiments described above may be combined with each other.

What is claimed is:
1. A vibration device comprising:
a base substrate made of silicon and having a first surface and a second surface facing away from the first surface;
a lid bonded to the base substrate;
a vibrator disposed at the first surface of the base substrate and accommodated in a space between the base substrate and the lid; and
a thermistor element disposed at the base substrate,
wherein the base substrate has a recess that has an opening on the first surface,
the thermistor element is disposed at a bottom surface of the recess,
a wiring is electrically coupled to the thermistor element,
a side surface of the recess is an inclining surface that inclines with respect to a thickness direction of the base substrate, and
the wiring is disposed at the bottom surface, the inclining surface, and the first surface.

2. The vibration device according to claim 1, wherein the thermistor element has a portion that overlaps with the vibrator in a plan view.

3. An electronic instrument comprising:
the vibration device according to claim 1;
an oscillation circuit that causes the vibrator to oscillate;
an A/D converter that converts an analog signal outputted by the thermistor element into a digital signal; and
a processing circuit to which the digital signal outputted by the A/D converter is inputted.

4. A vehicle comprising:
the vibration device according to claim 1;
an oscillation circuit that causes the vibrator to oscillate;
an A/D converter that converts an analog signal outputted by the thermistor element into a digital signal; and
a processing circuit to which the digital signal outputted by the A/D converter is inputted.

5. A vibration device comprising:
a base substrate made of silicon and having a first surface and a second surface facing away from the first surface;
a lid bonded to the base substrate;
a vibrator disposed at the first surface of the base substrate and accommodated in a space between the base substrate and the lid; and
a thermistor element disposed at the base substrate,
wherein the base substrate has a recess that has an opening on the second surface,
the thermistor element is disposed at a bottom surface of the recess,
a wiring is electrically coupled to the thermistor element,
a side surface of the recess is an inclining surface that inclines with respect to a thickness direction of the base substrate, and
the wiring is disposed at the bottom surface, the inclining surface, and the second surface.

* * * * *